A. L. McTAGGART.
TRACTOR.
APPLICATION FILED FEB. 24, 1913.

1,298,986.

Patented Apr. 1, 1919.
3 SHEETS—SHEET 1.

WITNESSES

INVENTOR
A. L. McTaggart
Alex. J. Wedderburn, Jr., Attorney

A. L. McTAGGART.
TRACTOR.
APPLICATION FILED FEB. 24, 1913.

1,298,986.

Patented Apr. 1, 1919.
3 SHEETS—SHEET 2.

WITNESSES
M. P. McKee
R. Kisluik

INVENTOR
A. L. McTaggart
Alex. J. Wedderburn, Jr.
Attorney

A. L. McTAGGART.
TRACTOR.
APPLICATION FILED FEB. 24, 1913.
1,298,986.
Patented Apr. 1, 1919.
3 SHEETS—SHEET 3.
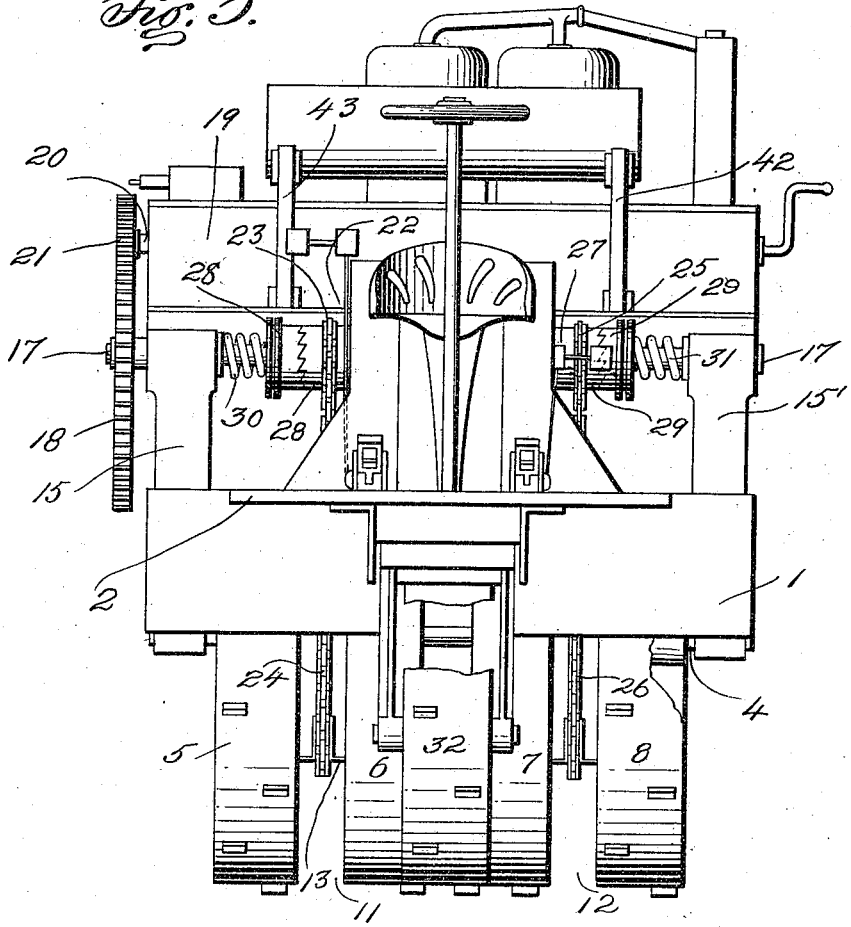
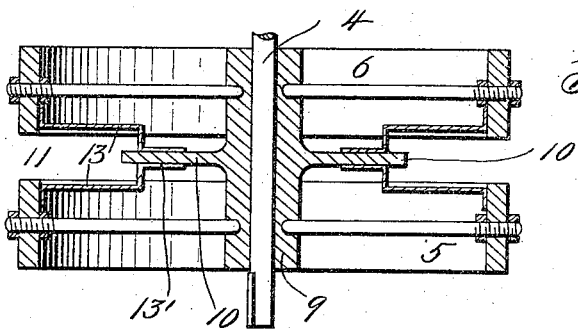
WITNESSES
INVENTOR
Attorney

UNITED STATES PATENT OFFICE.

ANGUS L. McTAGGART, OF PITTSBURGH, PENNSYLVANIA.

TRACTOR.

1,298,986.   Specification of Letters Patent.   Patented Apr. 1, 1919.

Application filed February 24, 1913. Serial No. 750,268.

*To all whom it may concern:*

Be it known that I, ANGUS L. McTAGGART, a subject of the King of England, residing at Pittsburgh, in the county of Allegheny and State of Pennsylvania, have invented certain new and useful Improvements in Tractors, of which the following is a specification.

This invention relates to improvements in tractors and its object is to provide an inexpensive tractor for gang plows.

Another object of the invention is to provide means whereby a tractor may readily be turned within about its own length.

And another object of the invention is to provide a tractor with a rotatable tractor wheel with axle or shaft on which wheels rotate.

And another object of the invention is to provide a very compact and simple driving mechanism.

With the above and other objects in view I have invented the device illustrated in the accompanying drawings in which—

Fig. 3 is a front elevation of my invention and

Fig. 4 is a vertical sectional view of a tractor wheel.

Figure 1:
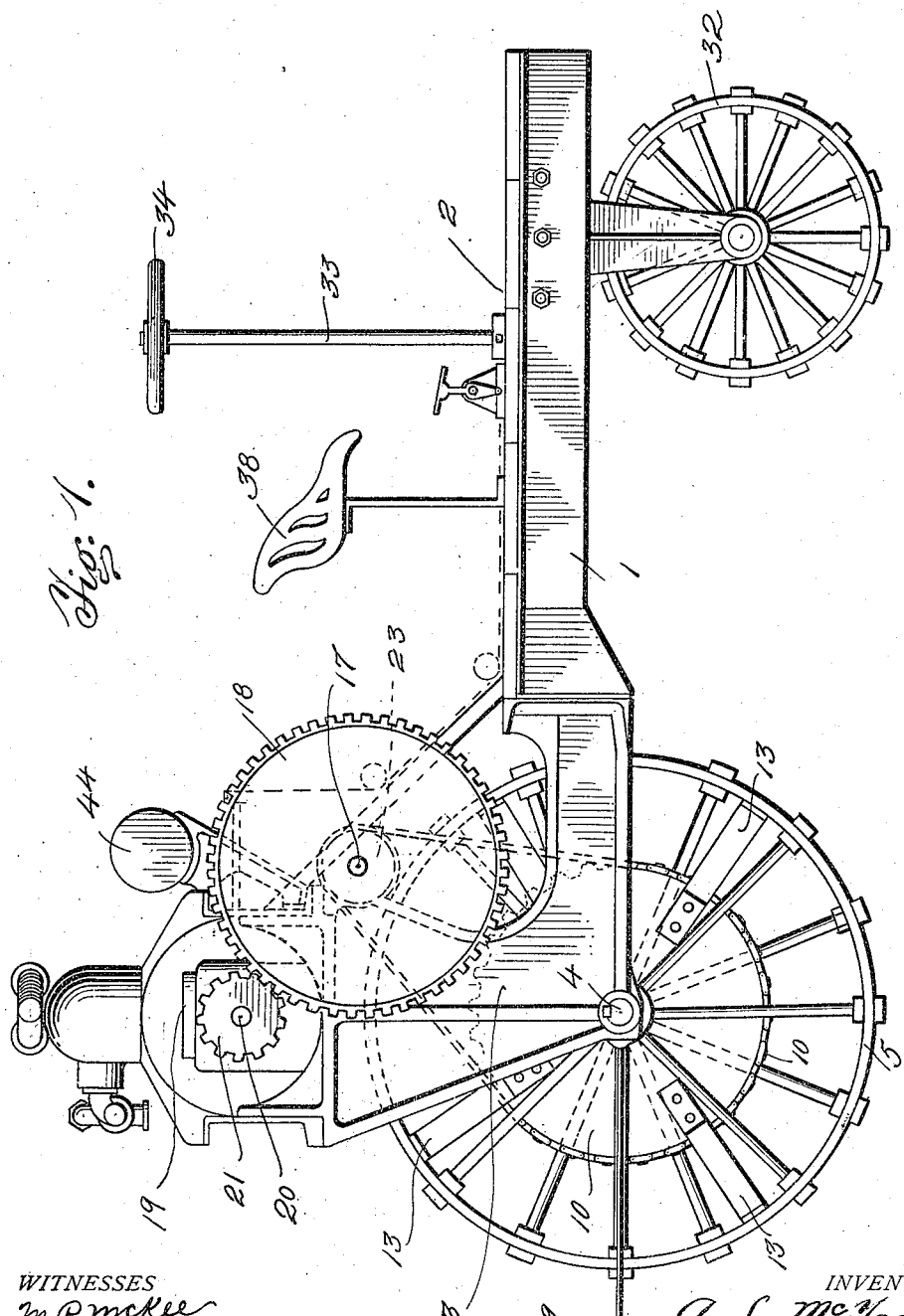
Figure 1 is a side elevation of my improved tractor.
Figure 2:
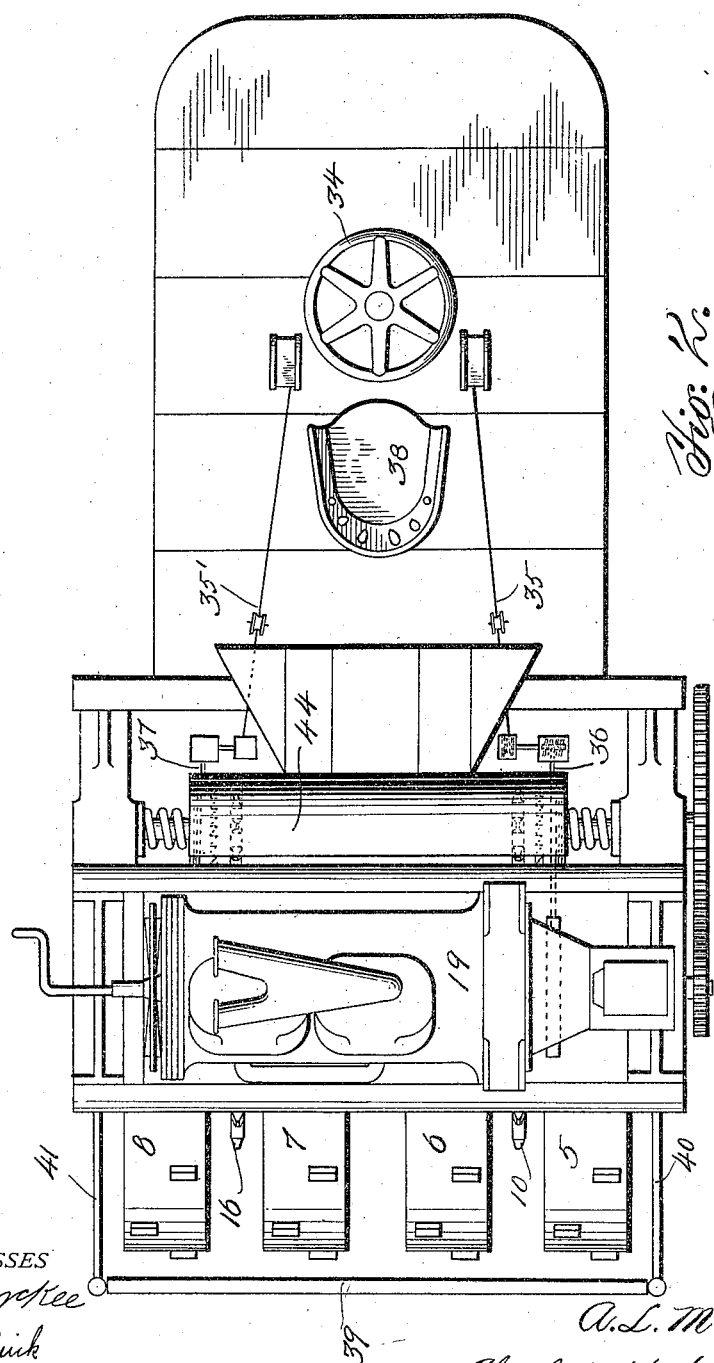
Fig. 2 is a top plan view.

Like reference characters indicate like parts throughout the specification and in the several views in the drawings in which 1 indicates a frame having a forward platform 2 and vertical housings 3 in which are keyed the ends of the tractor wheel shaft 4 which is stationary. Rotating on axle or fixed shaft 4 are two pairs of wheels 5—6 and 7—8, each pair being mounted on a common hub 9 which hubs have sprocket wheels 10 and 16 located between the pairs of wheels which are spaced apart as shown at 11 and 12, coupling members 13 being used to hold said wheels in rigid relation, said members being secured at 13′ to said sprocket wheels 10 and 16. Bearings 15 and 15′ which are part of housings 3 support the shaft 17 which has a gear wheel 18 fixed thereto by means of which it is rotated.

Mounted on the upper part of the vertical portion of the frame is an engine 19 which drives the shaft 20 upon which is fixed the gear 21 which meshes with and drives the gear 18. The engine or drive shaft extends laterally of the frame with one end projecting slightly therefrom, and the shaft 17 is arranged parallel therewith with one end also extending slightly beyond the frame. This construction permits the employment of the relatively large gear 18.

On the shaft 17 are loose collars 22 and 27 having sprocket wheels 23 and 25 thereon and sprocket chains 24 and 26 connect these sprocket wheels to the sprocket wheels 10 and 16.

On the shaft 17 are keyed slidable clutches 28 and 29 which are keyed to said shaft so as to rotate therewith. These clutches are pressed into normal engagement with the toothed sprocket collars 22 and 27 by the springs 30 and 31 so that normally both collars are rotated in unison by said shaft 17 which causes both pairs of wheels 5—6 and 7—8 to rotate together on fixed shaft 4.

I contemplate employing, and have so illustrated, the usual forward guide wheel 32 operable by steering wheel 34 and intermediate mechanism including rod 33.

Any suitable means in reach of the operator may be employed for shifting the clutches employed in connection with the engine driving mechanism and the clutches on shaft 17. As shown, I employ for shifting the engine clutch, a rod or cable 35 having one end connected with a foot pedal and its other end connected with a shifting mechanism 36, said mechanism being of the usual construction and connected with the clutch.

In the drawings, I have shown means for operating the right hand differential clutch on shaft 17 only, it being understood that similar means are employed for the other clutch mechanism on said shaft 17. These means include a foot pedal, a rod or cable 35′ and shifting mechanism 37.

By the employment of the independently rotatable tractor wheels and the means shown including the clutches on shaft 17 and the connections therefrom to said wheels, whereby one wheel may be rotated independently of another, I provide a construction enabling the tractor to be turned in the smallest possible space. This is accomplished by throwing out the clutch on the turning side while maintaining the other clutch in engagement, thus rotating the wheel on the far side while the wheel on the turning side acts as a fixed pivot point. A seat is provided on platform 2 for the driver.

On the rear frame is fixed a member 39 by means of arms 40 and 41 to which a gang of plows (not shown) may be attached. Brackets 42 and 43 support an oil tank 44 for supplying fuel to the engine 19 for running the tractor.

Having now described my invention, that which I claim to be new and desire to procure by Letters Patent is:—

1. In a tractor, a frame, an engine mounted on the rear portion of the frame above the tractor wheels thereof and having its driving shaft projecting therefrom extending laterally of the frame, a driving pinion on said shaft, a counter-shaft extending parallel with the engine shaft, a gear on the counter-shaft meshing with the said pinion, a plurality of closely assembled and independently rotatable tractor wheels, and mechanism including means carried on the counter-shaft for independently driving said wheels.

2. In a tractor, a frame, an engine mounted on the rear portion of the frame above the tractor wheels thereof and having its driving shaft projecting therefrom and extending beyond a side of the frame, a driving pinion on the end of said shaft, a counter-shaft extending parallel with the engine shaft, a gear on the end of the counter-shaft meshing with said pinion, a common fixed shaft, a plurality of closely assembled and independently rotatable tractor wheels mounted on the fixed shaft, and mechanism including means carried on the counter-shaft for independently driving said wheels.

3. In a tractor, a frame including spaced apart uprights or housings, an engine carried by said uprights, said engine having its driving shaft projecting therefrom and extending laterally of the frame, a driving pinion on one end of said shaft, a counter-shaft extending parallel with the engine shaft, a gear on an end of the counter-shaft meshing with said pinion, a common fixed shaft, a plurality of independently rotatable tractor wheels on the fixed shaft, said tractor wheels being closely assembled on the fixed shaft and disposed in a plane below the engine, and mechanism including means on the counter-shaft for independently driving said wheels.

In testimony whereof I affix my signature in presence of two witnesses.

ANGUS L. McTAGGART.

Witnesses:
S. H. ALLEN,
L. H. McCABE.

Copies of this patent may be obtained for five cents each, by addressing the "Commissioner of Patents, Washington, D. C."